United States Patent
Gupta et al.

[11] Patent Number: 5,942,197
[45] Date of Patent: *Aug. 24, 1999

[54] COUNTERCURRENT REACTOR

[75] Inventors: Ramesh Gupta, Berkeley Heights; Jeffrey W. Frederick, Morris Plains; Edward S. Ellis, Basking Ridge; David C. Dankworth, Whitehouse Station; Dimitrios M. Tsangaris, Berkeley Heights, all of N.J.

[73] Assignee: Exxon Research and Engineering Co, Florham Park, N.J.

[ * ] Notice: This patent is subject to a terminal disclaimer.

[21] Appl. No.: 08/885,788

[22] Filed: Jun. 30, 1997

Related U.S. Application Data

[63] Continuation-in-part of application No. 08/702,334, Aug. 23, 1996.

[51] Int. Cl.[6] .................................................. B01J 8/04
[52] U.S. Cl. .......................... 422/191; 422/194; 422/195; 422/220; 422/106; 422/111; 422/112; 261/148
[58] Field of Search ........................... 422/191, 194–196, 422/106, 111–112, 220; 202/158, 163, 232; 203/29, DIG. 6; 208/142–143; 261/146–148

[56] References Cited

U.S. PATENT DOCUMENTS

| | | | |
|---|---|---|---|
| 3,147,210 | 9/1964 | Hass et al. | 208/210 |
| 3,767,562 | 10/1973 | Sze et al. | 208/57 |
| 3,775,291 | 11/1973 | Sze | 208/57 |
| 4,026,674 | 5/1977 | McDonald | 422/191 |
| 4,526,757 | 7/1985 | Gupta | 422/191 |
| 5,183,556 | 2/1993 | Reilly et al. | 208/57 |
| 5,449,501 | 9/1995 | Leubke et al. | 422/193 |
| 5,670,116 | 9/1997 | Gupta et al. | 422/191 |

*Primary Examiner*—Hien Tran
*Attorney, Agent, or Firm*—Henry E. Naylor

[57] ABSTRACT

A reactor is provided for reacting a liquid with a treat gas in the presence of a catalyst, the reactor comprising a continuous wall enclosing a first reaction zone, wherein the first reaction zone includes a catalyst for causing a desired reaction between the liquid and the treat gas; a liquid inlet above the first reaction zone for allowing a portion of the liquid to enter the reactor; a gas inlet below the first reaction zone for allowing a portion of the treat gas to enter the reactor; a liquid outlet below the first reaction zone for allowing a reacted portion of the liquid to exit the reactor; a gas outlet above the first reaction zone for allowing a portion of the treat gas to exit the reactor; and a gas bypass device in the first reaction zone for allowing a portion of the treat gas to bypass a portion of the first reaction zone, the gas bypass device including a gas bypass regulating device for regulating the amount of treat gas which bypasses the first reaction zone. In a preferred embodiment, a plurality of reaction zones are present, and a liquid distribution tray is disposed above each reaction zone. Preferably, the gas bypass device creates a hydrostatic seal with the liquid accumulating in the distribution tray so that the timing and extent of gas bypass is self-regulating based on predefined flooding conditions.

18 Claims, 3 Drawing Sheets

COUNTERCURRENT REACTOR

CROSS REFERENCE TO RELATED APPLICATIONS

This is a continuation-in-part of U.S. Ser. No. 08/702,334; filed Aug. 23, 1996.

FIELD OF THE INVENTION

The present invention relates to a reactor for processing liquid petroleum or chemical streams wherein the stream flows countercurrent to the flow of a treat gas, such as a hydrogen-containing gas, in at least one interaction zone. The reactor contains vapor, and optionally liquid, passageways to bypass one or more packed beds, preferably catalyst beds. This permits more stable and efficient vessel operation.

DESCRIPTION OF THE PRIOR ART

There is a continuing need in the petroleum refining and chemical industries for improved catalysts and process technology. One such process technology, hydroprocessing, has been subjected to increasing demands for improved heteroatom removal, aromatic saturation, and boiling point reduction. More active catalysts and improved reactor designs are needed to meet this demand. Countercurrent reactors have the potential of helping to meet these demands because they offer certain advantages over co-current flow reactors. Countercurrent hydroprocessing is well known, but of very limited commercial use. A countercurrent process is disclosed in U.S. Pat. No. 3,147,210 which teaches a two-stage process for the hydroprocessing-hydrogenation of high boiling aromatic hydrocarbons. The feedstock is first subjected to catalytic hydroprocessing, preferably in co-current flow with hydrogen. It is then subjected to hydrogenation over a sulfur-sensitive noble metal hydrogenation catalyst countercurrent to the flow of a hydrogen-rich gas. U.S. Pat. Nos. 3,767,562 and 3,775,291 disclose a similar process for producing jet fuels, except the jet fuel is first hydrodesulfurized prior to two-stage hydrogenation. U.S. Pat. No. 5,183,556 also discloses a two-stage concurrent-countercurrent process for hydrofining—hydrogenating aromatics in a diesel fuel stream.

An apparatus is disclosed in U.S. Pat. No. 5,449,501 that is designed for catalytic distillation. The distillation apparatus, which is a vessel, contains vapor passageways which provide a means for vapor communication between fractionation sections located above and below catalyst beds. Substantially all of the vapor in the vessel rises through the vapor passageways and the desired contacting between vapor and liquid occurs only in the fractionation sections.

While the concept of countercurrent hydroprocessing has been known for some time, countercurrent flow reactors are typically not used in the petroleum industry, primarily because conventional fixed bed reactors are susceptible to catalyst bed flooding when operated in countercurrent flow mode. That is, the relatively high velocity of the upflowing treat gas prevents the downward flow of the liquid. The liquid thus cannot pass through the catalyst bed. While flooding is undesirable, catalyst contacting by the reactant liquid improves as the bed approaches a flooded condition. However, operating close to the point of incipient flooding leaves the process vulnerable to fluctuations in pressure or temperature or in liquid or gas flow rates. This could result in a disturbance large enough to initiate flooding, and process unit shutdown in order to recover stable operation. Such disruptions are highly undesirable in a continuous commercial operation.

One solution to the flooding problems associated with countercurrent reactors is disclosed in U.S. Ser. No. 08/702,334 by several of the inventors herein. In that reactor, one or more gas bypass tubes are disposed across the catalyst beds which allow the treat gas to bypass the reaction zone. Allowing the gas to bypass the reaction zone maintains the pressure differential across the reaction zone at a level that prevents flooding. While that invention does increase the efficiency and productivity of the reactor, it lacks a simple and effective means of regulating the amount of gas which is to bypass the reaction zone. Ideally, gas should be diverted only at a time just prior to a predefined flood condition, and only to the extent necessary to maintain the liquid at pre-flood levels.

Therefore, there still exists a need for improved countercurrent reactor designs which are not as readily susceptible to flooding, which can more easily recover without shutdown should flooding occur, and which allow the reactor to operate at pre-flood conditions.

SUMMARY OF THE INVENTION

It is therefore an object of the present invention to provide a countercurrent reactor which minimizes the occurrence of flooding.

Another object of the present invention is to provide a countercurrent reactor which more easily recovers from a flooding condition without the necessity of shutting down the reaction process.

It is also an object of the present invention to provide a countercurrent reactor which includes a gas bypass capability which is self-regulating in terms of the timing and the amount of gas bypassed.

Still another object of the present invention is to provide a countercurrent reactor whose gas bypass device is simple and which requires a minimum of maintenance.

These and other objects and advantages of the present invention will no doubt become apparent to those skilled in the art after having read the following description of the preferred and alternate embodiments, which are contained in and illustrated by the various drawing figures.

Therefore, in accordance with the present invention, a reactor is provided for reacting a liquid with a treat gas in the presence of a catalyst, the reactor comprising a continuous wall enclosing a first reaction zone, wherein the first reaction zone includes a bed of catalysts for causing a desired reaction between the liquid and the treat gas; liquid inlet means above the first reaction zone for allowing an unreacted portion of the liquid to enter the reactor; gas inlet means below the first reaction zone for allowing an unreacted portion of the treat gas to enter the reactor; liquid outlet means below the first reaction zone for allowing a reacted portion of the liquid to exit the reactor; gas outlet means above the first reaction zone for allowing a reacted portion of the treat gas to exit the reactor; and gas bypass means in the first reaction zone for allowing a portion of the treat gas to bypass a portion of the first reaction zone, the gas bypass means including gas bypass regulating means for regulating the amount of treat gas which bypasses the portion of the first reaction zone. The above arrangement allows the liquid and the treat gas to flow in countercurrent fashion across the catalyst bed within the reaction zone.

In a preferred embodiment, the reactor includes a plurality of reaction zones, and a liquid distribution tray is disposed above each reaction zone. The gas bypass means comprises a conduit having a lower section and an upper section, and wherein the upper section is capable of forming a hydrostatic seal with the liquid accumulating in the liquid distribution tray; and the lower section is disposed within or extends below the first reaction zone.

Optionally, the reactor may further include at least one reaction zone disposed above the first reaction zone; and second gas inlet means disposed above that additional reaction zone for establishing a flow of treat gas in substantially the same direction as the flow of liquid, i.e. in a "downward" direction. Alternatively, or in addition, liquid feedstock can be introduced below the additional reaction zone, but above the first reaction zone, with additional treat gas at the same level, so that the vapor phase of the feedstock can be reacted in co-current fashion with the additional treat gas, i.e. in an "upward" direction.

DETAILED DESCRIPTION OF THE INVENTION

The reactors of the present invention are suitable for use in any petroleum or chemical process wherein it is advantageous to pass a gas, such as a hydrogen-containing treat gas, countercurrent to the flow of liquid feedstock. Non-limiting examples of refinery processes in which the instant reactors can be employed include the hydroconversion of heavy petroleum feedstocks to lower boiling products; the hydrocracking of distillate boiling range feedstocks; the hydrotreating of various petroleum feedstocks to remove heteroatoms, such as sulfur, nitrogen, and oxygen; the hydrogenation of aromatics; and the hydroisomerization and/or catalytic dewaxing of waxes, particularly Fischer-Tropsch waxes. It is preferred that the reactors of the present invention be those in which a hydrocarbon feedstock is hydrotreated and hydrogenated, more specifically when heteroatoms are removed and when at least a portion of the aromatic fraction of the feed is hydrogenated.

A brief description of the problems often seen in conventional countercurrent reactors will facilitate an understanding of the advances offered by the present invention. In countercurrent processing, the vertically upflowing gas hinders the downward movement of the liquid. At low liquid and gas velocities, the hindrance from the slowly moving gas is not enough to cause flooding and the liquid in the reactor is able to drain through the catalyst bed in the reaction zone. However, if either the upflowing gas rate or the downflowing liquid rate is too high, liquid cannot drain through the catalyst bed. This is known as "flooding." The liquid holdup in the bed increases and liquid may begin to accumulate above the top surface of the catalyst bed. The upflowing gas rate at which flooding occurs in a given bed will depend on such things as the rate and physical properties of the downflowing liquid, as well as the size and shape of the catalyst particles. Similarly, the downflowing liquid rate at which flooding occurs in a given bed similarly depends on the rate and properties of upflowing gas, as well as the size and shape of the catalyst particles.

As will be explained in further detail below, the reactors of the present invention are less susceptible to flooding than conventional countercurrent reactors because of passageways, or gas bypass means, which act to selectively bypass a fraction of the upward-flowing treat gas through one or more of the catalyst beds. It should be understood that the terms "treat gas" and "gas bypass" as used herein may also include any vaporized liquid that will have become mixed with the treat gas during the reactions. As the pressure differential increases to a predefined threshold level correlating to a near-flood condition, a fraction of upflowing treat gas is allowed to bypass one or more catalyst beds. When gas bypasses the catalyst bed, the pressure differential across the catalyst bed decreases to permit the downward flow of liquid. When the pressure differential falls below the predefined threshold level, the bypassing of gas is automatically stopped. Thus, the gas bypass means provide a self-regulating amount of upward-flowing treat gas, thereby extending the hydrodynamic operating window of the reactor. Further extension of this range can be provided by including one or more external gas bypass means equipped with flow control devices. Such a system provides a means by which catalyst bed pressure drop, and therefore catalyst contacting efficiency, can be further controlled. The external bypass can be used to assist the internal gas bypass means in keeping the reactor operating as close to flooding as desirable. The treat gas which does bypass a particular catalyst bed or beds will pass through the other catalyst bed(s) and serve to take part in the desired hydroprocessing reactions, carry away light or vaporized reaction products, strip catalyst poisons such as hydrogen sulfide, water and/or ammonia, etc.

Thus, the gas bypass means of the present invention provide an extended operating range and an opportunity to operate close to the flooding point of the reactor. This enables a more stable, more efficient reactor operating regime. Further, the reactor can safely and continuously operate while responding to normal process fluctuations in liquid and vapor flow rate and temperature. The range of total flow rates that can be tolerated is thereby extended. Operating close to the flooding point results in very efficient contacting because the catalyst particles are well irrigated by the downflowing liquid. In the absence of the gas bypass means, a conventional countercurrent reactor would need to operate at lower efficiency in order to remain operable.

The higher gas flow rate capacity of the reactors of the instant invention provides flexibility to use higher quench gas rates and/or treat gas rates, enabling wider breadth of application for reactions involving high hydrogen consumption and heat release, such as aromatics saturation. Furthermore, the higher gas handling capacity enables the use of countercurrent reaction processing for reactions involving evolution of vapor phase products which might otherwise result in flooding due to excessive vapor generated during reaction, e.g., hydrocracking.

If flooding does occur, the reactors of the present invention are also more easily recovered and brought back to normal operation. During flooding, the liquid holdup in the bed increases and liquid may begin to accumulate above the top surface of the bed. This liquid backup must be drained to recover from flooding. The gas bypass means reduce the gas flow rate through the catalyst bed when flooding occurs, or when activated, allowing the liquid to more easily drain through the catalyst bed.

Unless otherwise stated herein, the terms "downward" and "upward" are with respect to the flow of liquid which will preferably flow downward. Further, the vessels of the present invention need not be limited to catalytic chemical reactions, but can also be used in gas-liquid contacting towers such as those used for distillation, extraction or stripping. In such cases, no reaction is necessarily involved and the upward-moving gas contacts a downward-moving liquid, typically to achieve mass transfer between the two streams.

Figure 1:
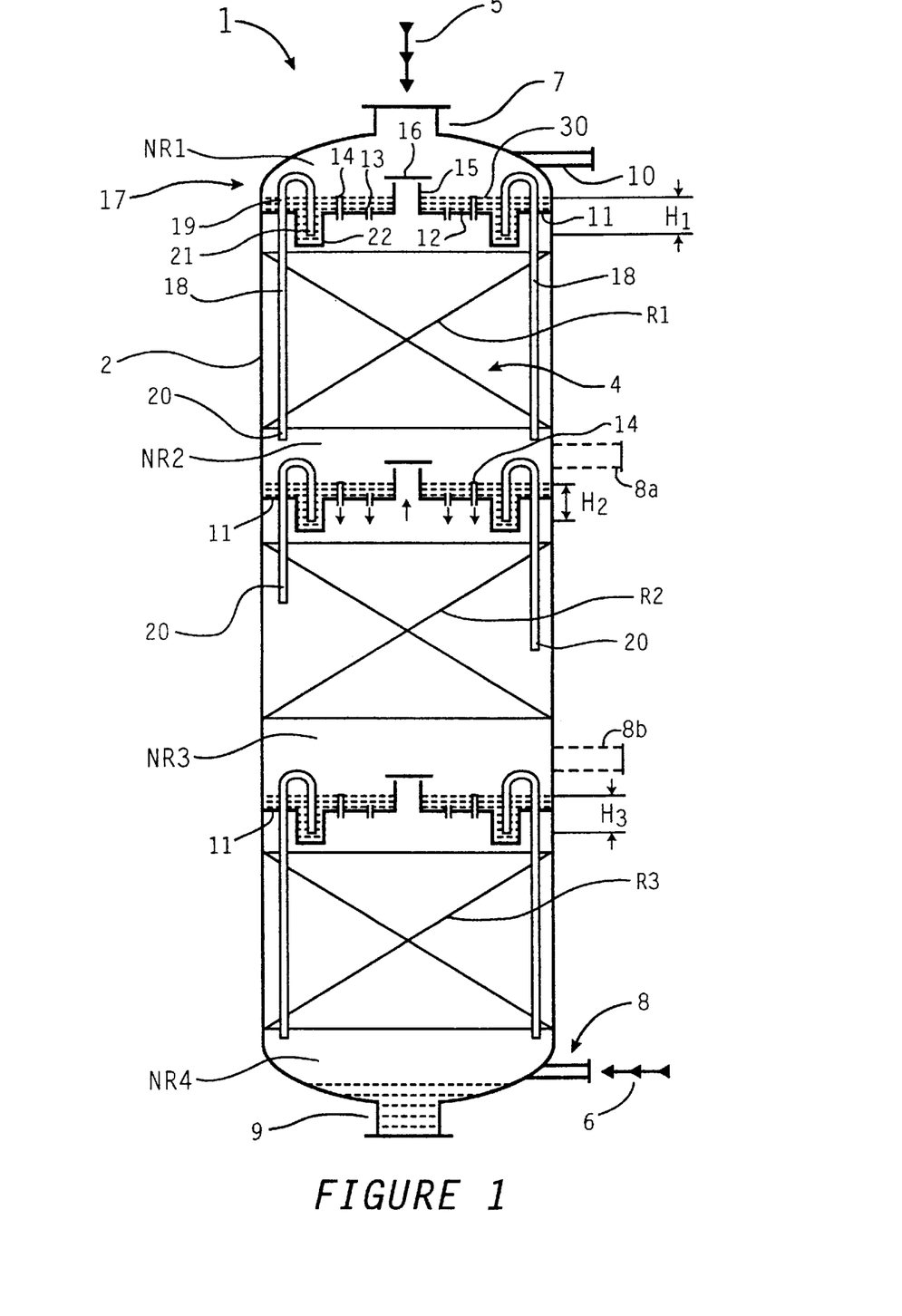
FIG. 1 is a cross-sectional view of a preferred embodiment of the present invention showing three reaction zones, each of which includes the gas bypass means disposed in an operating position with respect to the liquid distribution trays.

Turning now to FIG. 1, one embodiment of a reactor 1 of the present invention is shown to generally comprise a continuous wall 2 which encloses at least one reaction zone R1 having a catalyst bed 4 suitable for causing a desired reaction between a liquid 5 and a treat gas 6. Miscellaneous reactor internals, such as thermocouples, heat transfer devices, and the like not bearing upon points of novelty are omitted from the figures for reasons of clarity. Although three such reaction zones R1, R2, R3 are shown serially disposed in FIG. 1, the number of reaction zones within any given reactor will depend upon the particular needs of the reaction, as will be explained further herein. Each reaction zone is immediately preceded and immediately followed by a non-reaction zone NR1, NR2, NR3, NR4, which may be voids or empty sections in the reactor 1. Liquid inlet means 7 is located near the top of the reactor 1 and allows a portion of the incoming liquid 5, such as a feedstock to be treated, to enter the reactor 1. Gas inlet means 8 is located near the bottom of the reactor 1 and allows a portion of the incoming treat gas 6 to enter the reactor 1. Liquid outlet means 9 is located near the bottom of the reactor 1 and allows a reacted portion of the liquid to exit the reactor 1 as a reaction product. Analogously, gas outlet means 10 is located near the top of the reactor 1 and allows a portion of the gas to exit the reactor 1.

Liquid distribution means, preferably in the form of a distribution tray 11, is preferably disposed immediately above each reaction zone for uniformly distributing the downflowing liquid 5 across reaction zones R1, R2, R3. In a preferred embodiment, each tray 11 includes a bottom surface 12, capable of holding an accumulating liquid, whose periphery is in sealable contact with the vessel wall 2. A plurality of short tubes 13, each having an upper end which rises above bottom surface 12, are formed into tray 11 to allow liquid to be distributed across the immediately downstream reaction zone. The foregoing arrangement allows liquid to accumulate on the bottom surface 12 of the tray 11 until it reaches the height of the tubes 13. Only when the accumulated liquid exceeds the height of tubes 13 is the liquid uniformly distributed across the reaction zone immediately below the tray 11. Tray 11 further includes a plurality of taller, liquid level limiting tubes 14 which assist in draining the liquid accumulating within tray 11 which exceeds the drainage capacity of the shorter tubes 13. One or more gas vents 15 are also formed into tray 11 to allow passage of the upward moving treat gas. Gas vent 15 includes a cover or baffle 16 which prevents liquid from upstream reaction zones from bypassing the distribution tray 11 and entering a downstream reaction zone. However, gas vent 15 may still serve as a backup liquid draining means in the event that heavy flooding conditions occur. Persons of ordinary skill will appreciate that the aforedescribed tray 11 is one of many different designs which could be employed to allow uniform distribution of liquid across the bed.

As shown in FIG. 1, gas bypass means 17 is disposed across each reaction zone for allowing a portion of the treat gas to bypass at least a portion of the reaction zone. In a preferred embodiment, gas bypass means 17 comprises one or more gas bypass tubes 18 each having an upper section 19 and a lower section 20. Each gas bypass tube 18 enables fluidic communication of the treat gas between two separate non-reaction zones. With reference to the uppermost reaction zone R1 in FIG. 1, the lower section 20 of each gas bypass tube 18 terminates in non-reaction zone NR2, while the upper section 19 is formed into an inverted "U" shape whose terminal end 21 is disposed within a liquid well 22 formed into the liquid distribution tray 11. During operation of the reactor 1, accumulating liquid in the tray 11 will fill the well 22 and establish a hydrostatic seal with the terminal end 21 of the gas bypass tube 18. Once the hydrostatic seal is created, treat gas is prevented from entering non-reaction zone NR1 unless the pressure differential across reaction zone R1 exceeds the head pressure H1 of the hydrostatic seal H2 and R3 are the head pressure for the bypass tubes of reaction zones R2 and R3 respectively. More specifically, and as will be appreciated from FIG. 1, the pressure differential across the reaction zone R1 must exceed the total head pressure of at least one gas bypass tube 18 employed across the reaction zone R1 in order for gas bypass to occur.

For example, for a given size of catalyst bed, flooding may be expected to take place when the pressure differential exceeds 1.0–1.5 inches of liquid per foot of bed height. If the height of the catalyst bed is 20 feet, the liquid well 22 and the upper section 19 of the gas bypass tubes 18 must be designed to provide a cumulative hydrostatic head of approximately 20 inches. Based on known flooding conditions, a number of physical parameters will factor into the particular design employed, such as the inner diameter of the gas bypass tubes 18, the extent of immersion of the terminal end 21 into the liquid well 22, the height of the liquid accumulating within tray 11, and the number of gas bypass tubes 18 to be used across the particular reaction zone.

The foregoing design allows much flexibility in achieving optimum operating conditions. For example, in the event that any particular gas bypass tube 18 is designed to create a smaller head pressure, then gas will be allowed to bypass the reaction zone R1 only through that particular gas bypass tube 18. This effect could be achieved by shortening the terminal end 21 so that there is less liquid to overcome by the gas, or by perforations formed into the terminal end 21 to allow escape of the gas through the higher perforations. Thus, it can be seen that an array of gas bypass tubes 18 may optionally be positioned across any given reaction zone, wherein some gas bypass tubes 18 will yield to greater or lesser pressure differentials than others, resulting in the ability to bypass treat gas in stages. In other words, if the amount of bypassed gas through those gas bypass tubes 18 having a lesser head pressure is sufficient to prevent flooding, then no gas will be allowed to bypass through the remaining gas bypass tubes 18 whose head pressures are greater. Therefore, the maximum amount of treat gas at incipient flood levels will be forced through the reaction zone R1. This arrangement provides the opportunity to fine tune the release of gas across a range of pressure differentials, enabling the reactor 1 to operate very efficiently and under conditions which immediately precede flooding. An additional benefit of the present invention is that it will allow reactor operation to continue at near maximum efficiency while the pressure drop increases over time due to catalyst bed settling and/or fouling.

Importantly, the top of the U-shaped upper section 19 is located at a height above the maximum level of liquid that can accumulate within the tray 11. If a flooding upset occurs such that the liquid level rises rapidly above the liquid level limiting tubes 14, the gas vent 15 may serve as an additional liquid draining means to divert liquid to the reaction zone immediately downstream. Thus, the gas bypass tubes 18 will never act as a siphon to bypass unreacted liquid down to the next non-reaction zone.

Figure 2:
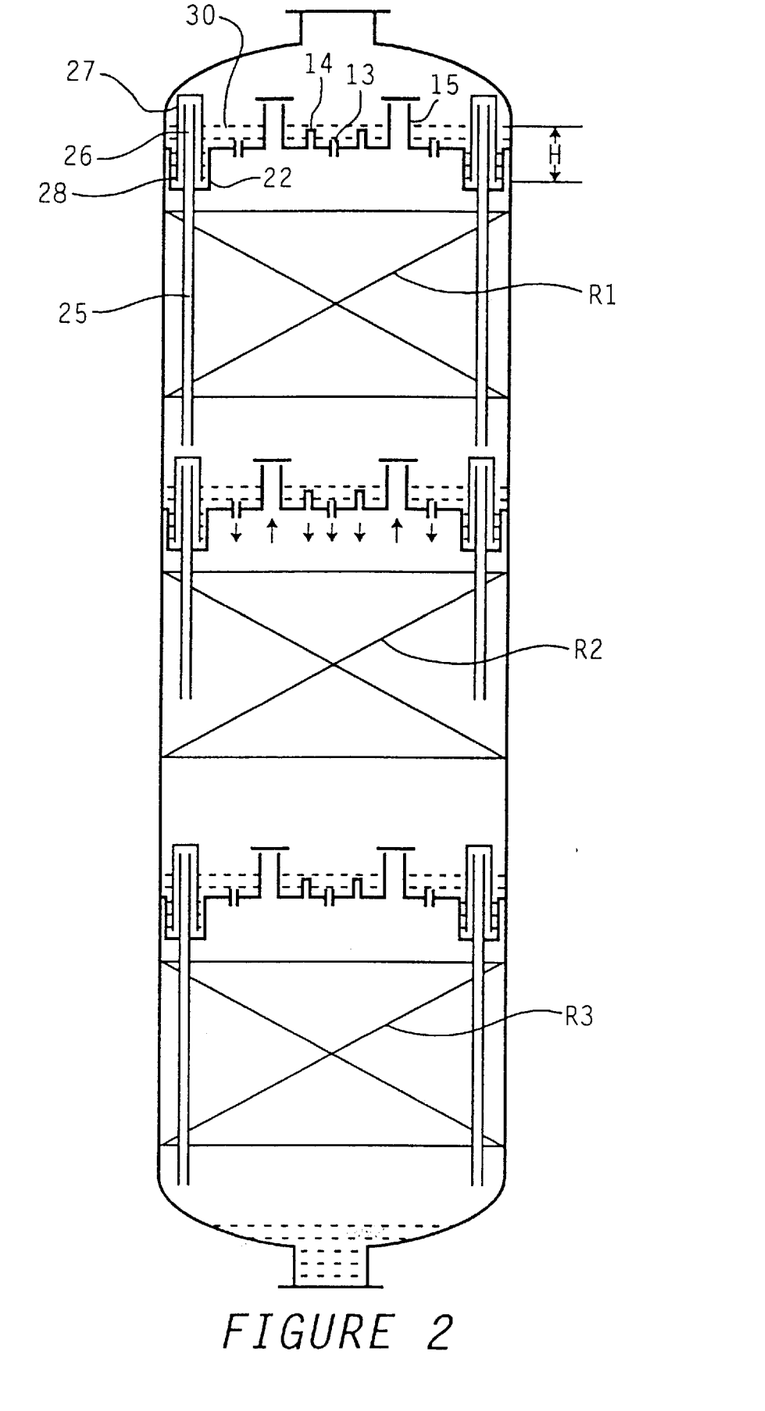
FIG. 2 depicts an alternative embodiment of the gas bypass means of FIG. 1.

Referring now to FIG. 2, an alternate embodiment of the invention is shown wherein the inverted "U" upper sections 19 of the gas bypass means 17 are omitted in favor of straight gas bypass tubes 25 each having upper ends 26 covered by an inverted container 27. In this embodiment, the head pressure H of each gas bypass tube 25 results from the liquid residing between the upper end 26 and the container 27. The height of the opening 28 of the container 27 relative to the liquid level 30 accumulating in the tray 11 determines the strength of the hydrostatic seal which must be overcome to release bypassed gas.

Figure 3:
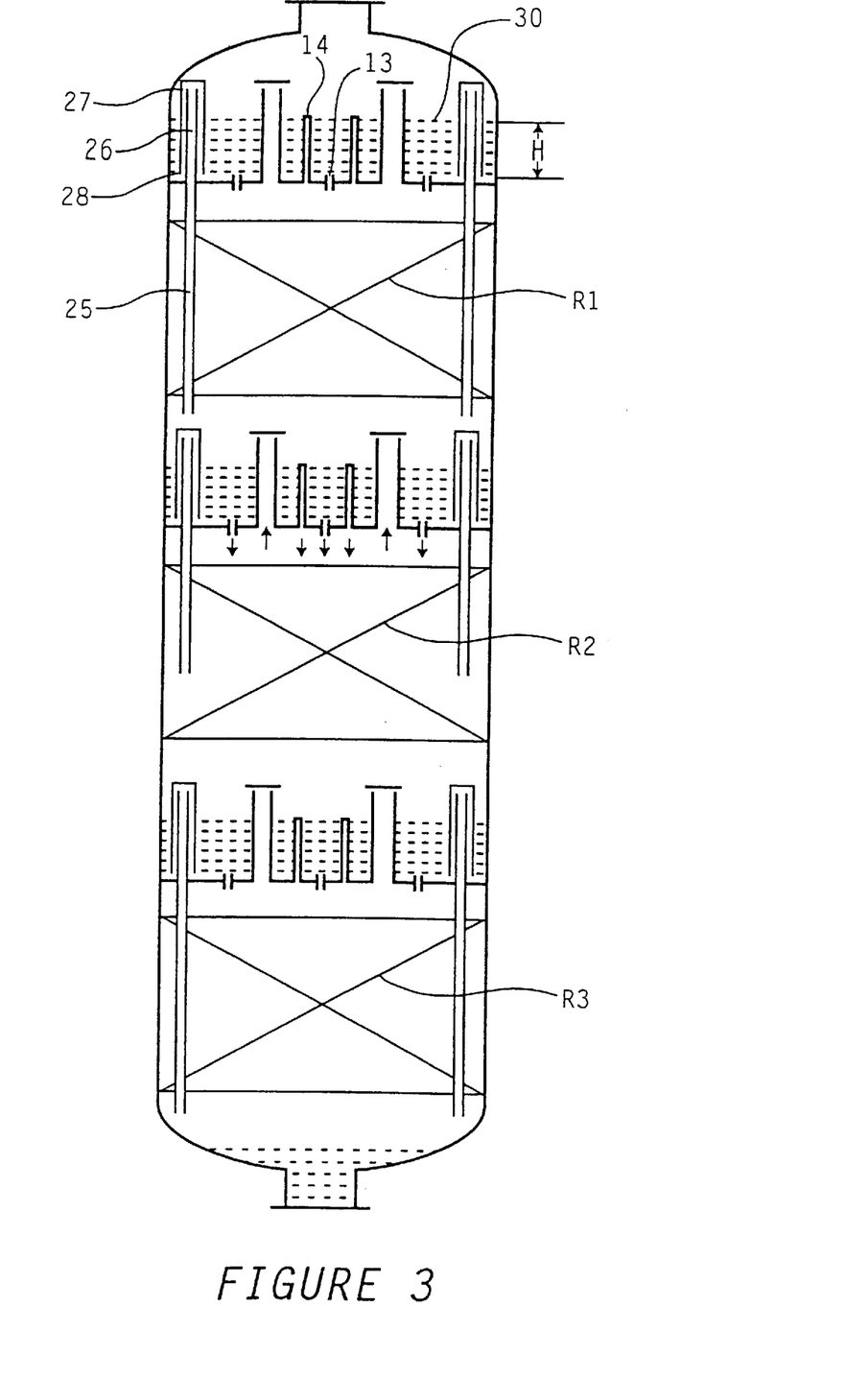
FIG. 3 depicts a further alternative embodiment of the gas bypass means of FIG. 2 which eliminates the necessity of a sink in the liquid distribution trays.

Similarly, in FIG. 3, a further alternative embodiment is depicted which does not employ the liquid wells 22, but rather uses a higher accumulating liquid inventory on the tray 11. As can be seen, higher liquid level limiting tubes 14 are required in this embodiment due to the higher required level of liquid to create the predetermined head pressures H. However, regardless of the various embodiments shown, either separately or in combination with one another, each operates with the same effectiveness and reliability by virtue of their simplicity.

Although the preferred embodiment of gas bypass means 17 employs a hydrostatic seal, a multitude of alternative devices may be employed which should accomplish the same or similar result. For example, any pressure-sensitive device which regulates the opening and closing of a valve within the gas bypass tubes would also be capable of venting the treat gas at the appropriate times. One such alternative device may comprise one or more spring-loaded valves disposed within straight gas bypass tubes.

It should be noted that the lower ends 20 of any of the gas bypass tubes 18,25 do not necessarily have to reside within a non-reaction zone. As shown in FIG. 1 with reference to reaction zone R2, the lower ends 20 of the gas bypass tubes 18 are actually within the catalyst bed. Consequently, the head pressure H2 for those particular gas bypass tubes 18 may be designed to be accordingly less than if the lower ends 20 were located entirely below the reaction zone R2. Thus, the reactor 1 may be configured so that an array of gas bypass tubes 18 are used wherein the lower end 20 of each gas bypass tube 18 originates at a different height within the reaction zone to be bypassed. In addition, the tubes 18 can be perforated to varying degrees along their length. In this manner, partially reacted gas may also be diverted to an upstream non-reaction zone, such as non-reaction zone NR2, if flooding conditions are imminent.

As indicated earlier herein, the reactor 1 is operated by introducing the liquid feedstock 5 to be treated into liquid inlet means 7. A suitable treat gas 6, such as a hydrogen-containing gas, is introduced via gas inlet means 8 into the reactor 1 countercurrent to the downward flow of the liquid feedstock 5. It is to be understood that the treat gas need not be introduced solely at the bottom of the reactor at gas inlet means 8, but may also be introduced into any one or more of the non-reaction zones NR1, NR2, NR3, NR4 such as in zones NR2 and NR3 via optional inlet means 8a and 8b respectively. Treat gas can also be injected into any one or more of the catalyst beds in reaction zones R1, R2, R3. An advantage of introducing treat gas at various points in the reactor is to control the temperature within the reactor. For example, cold treat gas can be injected into the reactor at various points to moderate any exothermic heat of reaction. It is also within the scope of this invention that additional treat gas can be introduced at any one of the aforesaid points. Likewise, liquid can be injected at various points and at appropriate temperatures also for the purpose of temperature control. When such temperature control techniques are employed, there will be resultant fluctuations in flow rate of the quench stream (gas or liquid) which will cause fluctuations in the pressure drop across the reaction zone 4. Therefore, the gas bypass tubes 18 provide the flexibility to accommodate these fluctuations while minimizing the risk of flooding that might otherwise occur.

The reactors used in the practice of the present invention are operated at suitable temperatures and pressures for the desired reaction. For example, typical hydroprocessing temperatures will range from about 40° C. to about 450° C. at pressures from about 50 psig to about 3,000 psig, preferably 50 to 2,500 psig. The liquid feedstock initially passes downward through the catalyst bed of reaction zone R1 where it reacts with the treat gas on the catalyst surface. Any resulting vapor-phase reaction products are swept upwards by the upward-flowing treat gas. Such vapor-phase reaction products may include relatively low boiling hydrocarbons and heteroatom components, such as $H_2S$ and $NH_3$. Any unreacted feedstock, as well as liquid reaction product pass downwardly through each successive catalyst bed of each successive reaction zone R2 and R3. At incipient flooding conditions, the self-regulating gas bypass tubes 18 allow selective bypassing of vapors produced in reaction zone R2 to the reactor gas outlet means 10, while bringing a higher purity hydrogen-containing treat gas into reaction zone R1 by selectively bypassing higher-purity hydrogen-containing gas from non-reaction zone NR3 to the bottom of reaction zone R1. The reacted liquid effluent exits the reactor via liquid outlet means 9, while the gas effluent exits via liquid outlet means 10. During the operation of the reactor, only a portion of the gas is bypassed, thus permitting enough gas upflowing through the catalyst beds to meet the treat gas (hydrogen) demand for that catalyst beds with relatively high kinetic efficiency.

The gas bypass tubes 18 may be constructed from any material that can withstand the operating conditions of the reactor. Suitable materials include metals, such as stainless and carbon steels; ceramic materials; as well as high performance composite materials such as carbon fiber materials. Preferred are tubular passageways having round cross sections. The tubes need not be perfectly vertical. That is, they can be inclined or curved, or even in the form of a spiral. It is to be understood that the tubes can be of any suitable size depending on the amount and rate of gas one wishes to bypass from one non-reaction zone to another. Also, any of the gas bypass tubes can be extended to allow bypass through more than one reaction zone. Some of the gas bypass tubes may extend through all the upstream reaction zones so that some of the gas can be withdrawn from the reactor without further contact with either the catalyst or the downflowing liquid. When a plurality of gas bypass tubes are used, it is preferred that they be concentrically located about the vertical axis of the reactor. One or more gas bypass tubes can also be routed external to the reaction zone. For example, a tubular arrangement can be used on the outside of the reactor so that one or more non-reaction zones are in fluid communication with any one or more other non-reaction zones. As mentioned earlier herein, the gas bypass tubes, either external or internal, may contain a flow control device to control the portion of gas which is passed from one non-reaction zone to another non-reaction zone. Such flow control devices could be used either as an alternative to the hydrostatic seal established by the gas bypass tubes or in combination therewith. If gas bypass tubes are provided external to the reactor, then it is preferred that the flow control device be simply a flow control valve common in the industry and known to those of ordinary skill.

It should be noted that the gas bypass tubes need not be hollow structures, such as solid-walled tubes, but they may contain a packing material, such as inert shapes, or catalyst particles, or both. Non-limiting examples of inert shapes which can be used as packing material include those which are convention in the art, such as balls, Raschig rings, Intalox saddles, Pall rings, Berl saddles, Cyclohelix spiral rings, Lessing rings, Cross-partition rings, etc. If catalyst particles compose at least a portion of the packing material in the gas bypass tubes, they can be used to further react the vapor phase reactants. The packing material and/or catalyst particles in the bypass tubes can be of a different size than the catalyst particles in the catalyst beds of the reaction zones. Such packing may help to improve the bypassing characteristics of the bypass tubes. The gas bypass tubes may also be perforated to allow vapor to be distributed along various levels of the catalyst bed.

Optionally, one or more co-current reaction zones may be upstream of one or more countercurrent reaction zones. For example, liquid feedstock can be introduced between two reaction zones such that the liquid phase of the feedstock flows downward into a downstream reaction zone, while the vapor phase of the feedstock flows upward through an upstream reaction zone. In connection with the upward flow of the vapor phase of the feedstock, additional treat gas can be introduced at the same level as the feedstock so that the treat gas will flow upward into the upstream reaction zone, co-current with the vapor phase of the feedstock. Consequently, the liquid feedstock will react in the lower reaction zones in countercurrent fashion with the treat gas introduced downstream of the reaction zones. The zones, regardless of flow direction, can be in separate vessels or two or more zones can be in the same vessel. However, it is preferred that all countercurrent zones be in the same vessel.

The practice of the present invention is applicable to all liquid-vapor countercurrent refinery and chemical processing systems. Feedstocks suitable for use in such systems include those in the naphtha boiling range as well as heavier feedstocks, such as mid-distillates, gas oils and resids. Typically, the boiling range will be from about 40° C. to about 1000° C. Non-limiting examples of such feeds which can be used in the practice of the present invention include vacuum resid, atmospheric resid, vacuum gas oil (VGO), atmospheric gas oil (AGO), heavy atmospheric gas oil (HAGO), steam cracked gas oil (SCGO), deasphalted oil (DAO), and light cat cycle oil (LCCO).

Some feedstocks treated by the practice of the present invention may contain high levels of heteroatoms, such as sulfur and nitrogen. In such cases, it may be preferred that the first reaction zone be one in which the liquid feedstream flows co-current with a stream of hydrogen-containing treat gas downward through a fixed-bed of suitable hydrotreating catalyst. The term "hydrotreating" as used herein refers to processes wherein a hydrogen-containing treat gas is used in the presence of a catalyst which is primarily active for the removal of heteroatoms, such as sulfur, and nitrogen with some hydrogenation of aromatics. The term "hydroprocessing" includes hydrotreating, but also includes processes which are primarily active toward the hydrogenation, hydrocracking, and hydroisomerization. Ring-opening, particularly of naphthenic rings, for purposes of this invention can also be included in the term "hydroprocessing". Suitable hydrotreating catalysts for use in the present invention are any conventional hydrotreating catalyst and includes those which are comprised of at least one Group VIII metal, preferably Fe, Co and Ni, more preferably Co and/or Ni; and at least one Group VI metal, preferably Mo or W, more preferably Mo, on a high surface area support material, preferably alumina. Other suitable hydrotreating catalysts include zeolitic catalysts, as well as noble metal catalysts where the noble metal is selected from Pd and Pt. It is within the scope of the present invention that more than one type of hydrotreating catalyst be used in the same reactor. The Group VIII metal is typically present in an amount ranging from about 2 to 20 wt. %, preferably from about 4 to 12 wt. %. The Group VI metal will typically be present in an amount ranging from about 5 to 50 wt. %/, preferably from about 10 to 40 wt. %, and more preferably from about 20 to 30 wt. %. All metals weight percents are on support. By "on support" we mean that the percents are based on the weight of the support. For example, if the support were to weigh 100 g. then 20 wt. % Group VIII metal would mean that 20 g. of Group VIII metal was on the support. Typical hydrotreating temperatures range from about 100° C. to about 430° C. with pressures from about 50 psig to about 3,000 psig, preferably from about 50 psig to about 2,500 psig. If the feedstock contains relatively low levels of heteroatoms, then the hydrotreating step may be eliminated and the feedstock passed directly to an aromatic saturation, hydrocracking, and/or ring-opening reaction zone.

For purposes of hydroprocessing, the term "hydrogen-containing treat gas" means a treat gas stream containing at least an effective amount of hydrogen for the intended reaction. The treat gas stream introduced to the reactor will preferably contain at least about 50 vol. %, more preferably at least about 75 vol. % hydrogen. It is preferred that the hydrogen-containing treat gas be make-up hydrogen-rich gas, preferably hydrogen.

In the case where the first reaction zone is a co-current downwardflow hydrotreating reaction zone, the liquid effluent from said hydrotreating reaction zone will be passed to at least one downstream reaction zone where the liquid is passed through a bed of catalyst countercurrent to the flow of upflowing hydrogen-containing treat-gas. Depending on the nature of the feedstock and the desired level of upgrading, more than one reaction zone may be needed. The most desirable reaction products resulting from hydroprocesssing, preferably when gas oils are the feedstocks, are those containing reduced levels of sulfur and nitrogen. Product streams containing paraffins, especially linear paraffins, are often preferred over naphthenes, which are often preferred over aromatics. To achieve this, at least one downstream catalyst will be selected from the group consisting of hydrotreating catalysts, hydrocracking catalysts, aromatic saturation catalysts, and ring-opening catalysts. If it is economically feasible to produce a product stream with high levels of paraffins, then the downstream zones will preferably include an aromatic saturation zone and a ring-opening zone.

If one of the downstream reaction zones is a hydrocracking zone, the catalyst can be any suitable conventional hydrocracking catalyst. Typical hydrocracking catalysts are described in U.S. Pat. No. 4,921,595 to UOP, which is incorporated herein by reference. Such catalysts are typically comprised of a Group VIII metal hydrogenating component on a zeolite cracking base. The zeolite cracking bases are sometimes referred to in the art as molecular sieves, and are generally composed of silica, alumina, and one or more exchangeable cations such as sodium, magnesium, calcium, rare earth metals, etc. They are further characterized by crystal pores of relatively uniform diameter between about 4 and 12 Angstroms. It is preferred to use zeolites having a relatively high silica/alumina mole ratio greater than about 3, preferably greater than about 6. Suitable zeolites found in nature include mordenite, clinoptilolite, ferrierite, dachiardite, chabazite, erionite, and faujasite. Suitable synthetic zeolites include the Beta, X, Y, and L crystal types, e.g., synthetic faujasite, mordenite, ZSM-5, MCM-22 and the larger pore varieties of the ZSM and MCM series. A particularly preferred zeolite is any member of the faujasite family, see Tracy et al. Proc. of the Royal Soc., 1996, Vol. 452, p. 813. It is to be understood that these zeolites may include demetallated zeolites which are understood to include significant pore volume in the mesopore range, i.e., 20 to 500 Angstroms. Non-limiting examples of Group VIII metals which may be used on the hydrocracking catalysts include iron, cobalt, nickel, ruthenium, rhodium, palladium, osmium, iridium, and platinum. Preferred are platinum and palladium, with platinum being more preferred. The amount of Group VIII metal will range from about 0.05 wt. % to 30 wt. %, based on the total weight of the catalyst. If the metal is a Group VIII noble metal, it is preferred to use about 0.05 to about 2 wt. %. If the Group VIII metal is not a noble metal, then a preferred formulation would also include a Group VI metal in proportion similar to that mentioned above for the hydrotreating catalysts. Hydrocracking conditions include temperatures from about 200° C. to 425° C., preferably from about 220° C. to 330° C., more preferably from about 245° C. to 315° C.; pressure of about 200 psig to about 3,000 psig; and liquid hourly space velocity from about 0.5 to 10 V/V/Hr, preferably from about 1 to 5 V/V/Hr.

Non-limiting examples of aromatic hydrogenation catalysts include nickel, cobalt-molybdenum, nickel-molybdenum, and nickel tungsten. Non-limiting examples of noble metal catalysts include those based on platinum and/or palladium, which is preferably supported on a suitable support material, typically a refractory oxide material such as alumina, silica, alumina-silica, kieselguhr, diatomaceous earth, magnesia, and zirconia. Zeolitic supports can also be used. Such catalysts are typically susceptible to sulfur and nitrogen poisoning. The aromatic saturation zone is preferably operated at a temperature from about 40° C. to about 400° C., more preferably from about 260° C. to about 350° C., at a pressure from about 100 psig to about 3,000 psig, preferably from about 200 psig to about 1,200 psig, and at a liquid hourly space velocity (LHSV) of from about 0.3 V/V/Hr. to about 2.0 V/V/Hr.

The liquid phase in the reactors used in the present invention will typically be the higher boiling point components of the feed. The vapor phase will typically be a mixture of hydrogen-containing treat gas, heteroatom impurities, and vaporized lower-boiling components in the fresh feed, as well as light products of hydroprocessing reactions. The vapor phase in the catalyst bed of a countercurrent reaction zone will be swept upward with the upflowing hydrogen-containing treat-gas and collected, fractionated, or passed along for further processing. The vapor phase effluent can be withdrawn from any non-reaction zone. If the vapor phase effluent still requires further hydroprocessing, it can be passed to a vapor phase reaction zone containing additional hydroprocessing catalyst and subjected to suitable hydroprocessing conditions for further reaction. It is to be understood that all reaction zones can either be in the same vessel separated by non-reaction zones, or any can be in separate vessels. The non-reaction zones in the latter case will typically include the transfer lines leading from one vessel to another.

If a co-current preprocessing step is performed, the vapor and liquid can be disengaged and the liquid effluent directed to the top of a countercurrent reactor. The vapor from the preprocessing step can be processed separately or combined with the vapor phase product from the reactor of the present invention. The vapor phase product(s) may undergo further vapor phase hydroprocessing if greater reduction in heteroatom and aromatic species is desired or sent directly to a recovery system.

The countercurrent contacting of liquid from an upstream reaction zone with upflowing treat gas strips dissolved $H_2S$ and $NH_3$ impurities from the effluent stream, thereby improving both the hydrogen partial pressure and the catalyst performance. The resulting final liquid product will contain a substantially lower level of heteroatoms and substantially more hydrogen than the original feedstock. This liquid product stream may be sent to downstream hydroprocessing or conversion processes.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A reactor for reacting a liquid with a treat gas in the presence of a catalyst, said reactor comprising:
   (a) a continuous wall enclosing a first reaction zone, wherein said first reaction zone includes catalyst means for causing a reaction between said liquid and said treat gas;
   (b) liquid inlet means above said first reaction zone for allowing a portion of said liquid to enter said reactor;
   (c) gas inlet means below said first reaction zone for allowing a portion of said treat gas to enter said reactor;
   (d) liquid outlet means below said first reaction zone for allowing a reacted portion of said liquid to exit said reactor;
   (e) gas outlet means above said first reaction zone for allowing a portion of said treat gas to exit said reactor; and
   (f) a distribution tray immediately above said first reaction zone for distributing said liquid to said first reaction zone; and
   (g) gas bypass means in said first reaction zone for allowing a portion of said treat gas to bypass at least a portion of said first reaction zone, said gas bypass means including gas bypass regulating means for regulating the amount of said treat gas which bypasses said portion of said first reaction zone, said gas bypass means comprising a conduit having a lower section and an upper section, and wherein: (aa) said upper section forms a hydrostatic seal with said liquid accumulating in said liquid distribution tray; and (bb) said lower section extending into or below said first reaction zone, wherein said regulating means is activated when the differential pressure across said first reaction zone exceeds the head pressure of hydrostatic seal.

2. The reactor of claim 1, wherein said reactor includes a plurality of said first reaction zones.

3. The reactor of claim 2, wherein each of said first reaction zones includes said gas bypass means.

4. The reactor of claim 1, further comprising:
   (a) a second reaction zone disposed above said first reaction zone; and
   (b) an additional gas inlet means disposed above said second reaction zone for establishing a flow of said treat gas in substantially the same direction as the flow of said liquid.

5. The reactor of claim 1, wherein said gas bypass means allows said portion of said treat gas to completely bypass said first reaction zone.

6. The reactor of claim 1, wherein said lower section extends into said first reaction zone and said upper section is formed into an inverted "U" shape whose terminal end is disposed within a liquid well formed in said liquid distribution tray.

7. The reactor of claim 1, wherein said lower section extends below said first reaction zone and said upper section is formed into an inverted "U" shape whose terminal end is disposed within a liquid well formed in said liquid distribution tray.

8. The reactor of claim 2, wherein said gas bypass means allows said treat gas to bypass two or more consecutive reaction zones.

9. The reactor of claim 1, wherein said upper section further includes an inverted container covering the terminal end of said upper section, wherein said inverted container includes an opening in contact with said liquid in said liquid distribution tray.

10. A reactor for reacting a liquid with a treat gas in the presence of a catalyst, said reactor comprising:
    (a) a continuous wall enclosing a first reaction zone, wherein said first reaction zone includes a catalyst adapted to cause a reaction between said liquid and said treat gas;
    (b) a liquid inlet above said first reaction zone for allowing a portion of said liquid to enter said reactor;
    (c) a gas inlet below said first reaction zone for allowing a portion of said treat gas to enter said reactor;
    (d) a liquid outlet below said first reaction zone for allowing a reacted portion of said liquid to exit said reactor;
    (e) a gas outlet above said first reaction zone for allowing a portion of said treat gas to exit said reactor; and
    (f) a distribution tray immediately above said first reaction zone for distributing said liquid to said first reaction zone; and
    (g) at least one gas bypass tube in said first reaction zone adapted to allow a portion of said treat gas to bypass a portion of said first reaction zone, said gas bypass tube including gas bypass regulator capable of regulating the amount of said treat gas which bypasses said portion of said first reaction zone, said gas bypass tube comprising a conduit having a lower section and an upper section, and wherein: (aa) said upper section forms a hydrostatic seal with said liquid accumulating in said liquid distribution tray; and (bb) said lower section extends within or below said first reaction zone, wherein said regulating means is activated when the differential pressure across said first reaction zone exceeds the head pressure of said hydrostatic seal.

11. The reactor of claim 10, wherein said reactor includes a plurality of said first reaction zones.

12. The reactor of claim 11, wherein each of said first reaction zones includes at least one gas bypass tube.

13. The reactor of claim 10, further comprising:
    (a) a second reaction zone disposed above said first reaction zone; and
    (b) an additional gas inlet disposed above said second reaction zone for establishing a flow of said treat gas in substantially the same direction as the flow of said liquid.

14. The reactor of claim 10, wherein said gas bypass tube allows said portion of said treat gas to completely bypass said first reaction zone.

15. The reactor of claim 10, wherein said lower section extends into said first reaction zone and said upper section is formed into an inverted "U" shape whose terminal end is disposed within a liquid well formed in said liquid distribution tray.

16. The reactor of claim 10, wherein said lower section extends into said first reaction zone and said upper section is formed into an inverted "U" shape whose terminal end is disposed within a liquid well formed in said liquid distribution tray.

17. The reactor of claim 11, wherein said gas bypass tube allows said treat gas to bypass two or more consecutive reaction zones.

18. The reactor of claim 10, wherein said upper section further includes an inverted container covering the terminal end of said upper section, wherein said inverted container includes an opening in contact with said liquid in said liquid distribution tray.

* * * * *